United States Patent
Miyazawa et al.

(10) Patent No.: US 7,789,330 B2
(45) Date of Patent: Sep. 7, 2010

(54) ROUNDISH FUSED ALUMINA PARTICLES, PRODUCTION PROCESS THEREOF, AND RESIN COMPOSITION CONTAINING THE PARTICLES

(75) Inventors: Hirokazu Miyazawa, Shiojiri (JP); Shinichiro Tomikawa, Shiojiri (JP)

(73) Assignee: Showa Denko K.K., Tokyo (JP)

( * ) Notice: Subject to any disclaimer, the term of this patent is extended or adjusted under 35 U.S.C. 154(b) by 962 days.

(21) Appl. No.: 10/591,079

(22) PCT Filed: Mar. 15, 2005

(86) PCT No.: PCT/JP2005/005045

§ 371 (c)(1),
(2), (4) Date: Aug. 30, 2006

(87) PCT Pub. No.: WO2005/087665

PCT Pub. Date: Sep. 22, 2005

(65) Prior Publication Data

US 2007/0183965 A1   Aug. 9, 2007

Related U.S. Application Data

(60) Provisional application No. 60/555,415, filed on Mar. 23, 2004.

(30) Foreign Application Priority Data

Mar. 15, 2004  (JP) .............................. 2004-073345
Nov. 19, 2004  (JP) .............................. 2004-336293

(51) Int. Cl.
    *B02C 19/06*   (2006.01)

(52) U.S. Cl. ............................................. 241/5
(58) Field of Classification Search ........................ 241/5
     See application file for complete search history.

(56) References Cited

U.S. PATENT DOCUMENTS

| | | | | |
|---|---|---|---|---|
| 3,837,583 A | * | 9/1974 | Kugelberg et al. | 241/39 |
| 5,421,524 A | * | 6/1995 | Haddow | 241/5 |
| 5,888,258 A | * | 3/1999 | Kaaber | 51/307 |
| 6,139,990 A | * | 10/2000 | Kubota et al. | 429/231.8 |
| 6,261,484 B1 | | 7/2001 | Phillips et al. | |

FOREIGN PATENT DOCUMENTS

| | | |
|---|---|---|
| EP | 0 276 321 A1 | 8/1988 |
| JP | 63-156011 A | 6/1988 |
| JP | 4-32004 A | 2/1992 |
| JP | 4-32004 B | 5/1992 |
| JP | 5-193908 A | 8/1993 |
| JP | 5-294613 A | 11/1993 |
| JP | 05-310419 A | 11/1993 |
| JP | 2001-19425 A | 1/2001 |
| JP | 2002-348116 A | 12/2002 |
| WO | WO 02/098795 A1 | 12/2002 |
| WO | WO 02/098796 A1 | 12/2002 |

* cited by examiner

*Primary Examiner*—Dana Ross
*Assistant Examiner*—Matthew G Katcoff
(74) *Attorney, Agent, or Firm*—Sughrue Mion, PLLC

(57) ABSTRACT

A roundish fused alumina particles having a mean particle size of 5 to 4,000 μm and a roundness of 0.85 or more, and a producing method thereof are provided. The method comprises removing edges of fused alumina particles by making the fused alumina particles collide with each other.

10 Claims, 1 Drawing Sheet

ROUNDISH FUSED ALUMINA PARTICLES, PRODUCTION PROCESS THEREOF, AND RESIN COMPOSITION CONTAINING THE PARTICLES

This is an application filed pursuant to 35 U.S.C. Section 111(a) with claiming the benefit of U.S. Provisional application Ser. No. 60/555,415 filed Mar. 23, 2004 under the provision of 35 U.S.C. Section 111(b), pursuant to 35 U.S.C. Section 119(e)(1).

TECHNICAL FIELD

The present invention relates to roundish (or rounded) fused alumina particles, and more particularly, to roundish fused alumina particles which are useful for wear-resistant floor material; sealing material for electronic parts; heat-dissipation substrate material; fillers; final lapping material; and aggregates and fillers incorporated into refractories, ceramics, or composites thereof, which causes little wear of apparatuses, and which exhibit excellent flow characteristics and filling characteristics. The invention also relates to an industrial, economical method for producing the roundish fused alumina particles, to a wear-resistant resin composition, to a high-thermal-conductivity rubber composition, and to a high-thermal-conductivity resin composition, all containing the alumina particles.

RELATED ART

In recent years, electric vehicles, hybrid vehicles, fuel cell vehicles, and similar vehicles have been remarkably developed to cope with environmental problems. Electronic parts used therein are operated by large currents, and the heat generated by the parts has increased. In addition, demands for higher integration and higher density of electronic parts have increased electric power consumption per chip. Thus, effective removal of generated heat, in order to suppress temperature elevation of electric and electronic elements, is a critical issue.

In order to solve the problems, a large amount of corundum ($\alpha$-alumina), which exhibits excellent thermal conductivity, is desirably incorporated into a high-thermal-conductivity rubber or resin composition. Among alumina materials, fused alumina particles have sharp edges, and are used as an abrasive, because the particles of the fused alumina are formed through crushing. Therefore, fused alumina particles cannot be incorporated into these parts in a large amount, and wear an apparatus such as a kneader or a mold, thereby elevating the production costs of alumina-particle-containing parts. For this reason, fused alumina particles have not been used as a filler.

Currently, roundish alumina particles are known to be produced through firing after addition of a chemical reagent (see, for example, Japanese Examined Patent Publication (kokoku) No. 4-32004 and Japanese Unexamined Patent Publication (kokai) No. 5-294613 and No. 2002-348116) or thermal spraying (see, for example, Japanese Unexamined Patent Publication (kokai) No. 5-193908, 63-156011 and 2001-19425). The roundish alumina particles are not fused alumina particles.

As the roundish alumina particles produced through firing after addition of a chemical reagent are sintered alumina particles, each particle is polycrystalline alumina having crystal grain boundaries. The roundish alumina particles produced through thermal spraying are also polycrystalline particles containing $\alpha$-alumina, $\delta$-alumina, and $\gamma$-alumina. These alumina particle species exhibit low thermal conductivity as compared with fused alumina virtually composed of single crystals, and are economically disadvantageous in that these species require a number of production steps and a large amount of heat energy.

Meanwhile, fused alumina particles have already been incorporated in some wear-resistant resin composition, e.g. floor materials requiring wear resistance. The thus-employed fused alumina particles also have drawbacks in that a large amount of the alumina particles, for enhancing wear resistance, cannot be incorporated into the parts, and that the alumina particles scratch a molding plate during formation of laminated products, due to the sharp edges of the particles.

According to the methods disclosed in the aforementioned patent documents, roundish alumina particles having no edges can be produced. However, the methods require a large amount of heat energy, which is disadvantageous in terms of economy, and the thus-produced alumina particles exhibit low thermal conductivity. In order to solve all of the aforementioned problems, preferably, roundish fused alumina particles must be fused alumina particles which exhibit high thermal conductivity without thermal treatment.

If roundish fused alumina particles can be produced through only shaping and rounding, without heat treatment, a heating apparatus and a cooling apparatus are no longer required, leading to the merit of a low facility cost.

DISCLOSURE OF THE INVENTION

The present inventors have conducted extensive studies in order to solve the problems involved in the conventional techniques, and have found that the problems can be solved by employing a production method using a jet mill so as to produce roundish fused alumina particles. The present invention has been accomplished on the basis of this finding.

Accordingly, the present invention for solving the problems is directed to the following:

[1] Roundish fused alumina particles having a mean particle size of 5 to 4,000 µm and a roundness of 0.85 or more.

[2] A method for producing the roundish fused alumina particles as recited in [1] above, characterized in that the method comprises removing edges of fused alumina particles by making the fused alumina particles collide with each other.

[3] A method for producing the roundish fused alumina particles as recited in [1] above, characterized in that the method comprises removing edges of fused alumina particles by means of a jet mill.

[4] The method for producing the roundish fused alumina particles as described in [3] above, wherein the jet mill is a counter-flow type mill.

[5] The method for producing the roundish fused alumina particles as described in [3] above, wherein the jet mill is a rotational-flow type jet mill.

[6] The method for producing the roundish fused alumina particles as described in [4] above, wherein the counter-flow type jet mill can arbitrarily control the nozzle pressure, the rotation speed of a classifier, and the operation time thereof.

[7] The method for producing the roundish fused alumina particles as described in [4] or [6] above, wherein the counter-flow type jet mill is operated at a nozzle pressure of 0.6 to 0.8 MPa.

[8] The method for producing the roundish fused alumina particles as described in [4], [6], or [7] above, wherein the counter-flow type jet mill is operated in a batch manner and the residue is provided as a product.

[9] A wear-resistant resin composition, characterized in that the resin composition contains the roundish fused alumina particles as recited in [1] above.

[10] A high-thermal-conductivity rubber composition, characterized in that the rubber composition contains the roundish fused alumina particles as recited in [1] above.

[11] A high-thermal-conductivity resin composition, characterized in that the resin composition contains the roundish fused alumina particles as recited in [1] above.

[12] A method for producing a wear-resistant resin composition, characterized by using the roundish fused alumina particles as described in [1] above.

[13] A method for producing a high-thermal-conductivity rubber composition, characterized by using roundish fused alumina particles as described in [1] above.

[14] A method for producing a high-thermal-conductivity resin composition, characterized by using the roundish fused alumina particles as described in [1] above.

According to the present invention, roundish fused alumina particles can be produced, industrially, at a low cost. The roundish fused alumina particles of the present invention exhibit a high thermal conductivity, as compared with conventional roundish alumina particles, and excellent filling characteristics. The roundish fused alumina particles of the present invention reduce wear of the machines and apparatuses for producing alumina-particle-containing compositions.

BEST MODES FOR CARRYING OUT THE INVENTION

Figure 1:
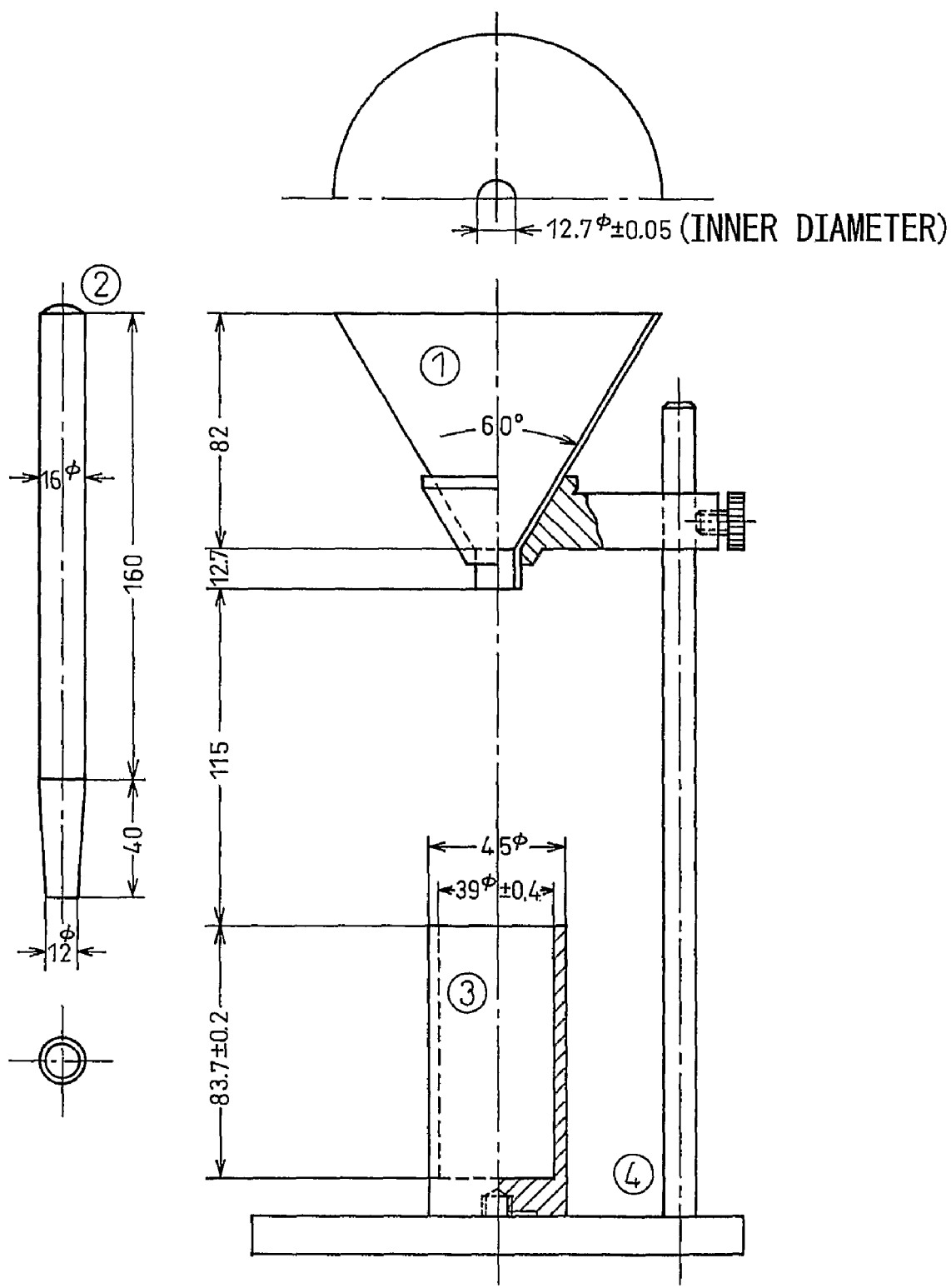
FIG. 1 is a schematic view of an apparatus used for determining bulk-density according to JIS-R6126 (1970).

The present invention will be described in detail as follows.

The present invention is directed to roundish fused alumina particles having a mean particle size of 5 to 4,000 μm and a roundness of 0.85 or more, and to a method for producing the roundish fused alumina particles, characterized in that the method comprises rounding fused alumina particles by means of a jet mill which is generally employed as a pulverizer.

In the present invention, the term "roundness" refers to a ratio of (a) to (b), wherein (a) is a projection area of a particle, and (b) is an area of a true circle having a peripheral length equal to the peripheral length of the projection image of the particle. As the shape of a particle approximates a true circle, the roundness of the particle approaches 1.

The roundish fused alumina particles of the present invention have a roundness of 0.85 or more, preferably 0.86 or more, more preferably 0.87 or more, still more preferably 0.88 or more. It is naturally possible for the roundish fused alumina particles of the present invention have a roundness of 0.90 or more. However, a roundness more than necessary leads to economical disadvantages such as a long shaping period. Generally speaking, a roundness no larger than 0.91 is preferable.

The fused alumina employed as a starting material in the present invention may be produced through a known method. The fused alumina preferably has a mean particle size of 5 to 4,000 μm, more preferably 5 to 500 μm. When the mean particle size is less than 5 μm, production yield becomes poor, because a classifier attached to a jet mill generally has a classification limit of about 2 to 3 μm. When the mean particle size is in excess of 4,000 μm, the particles are not sufficiently accelerated within a jet mill, thereby failing to gain the kinetic energy required to make the particles collide with each other to round them.

Though no particular limitation is imposed on the type of the jet mill used in the present invention, examples include counter-flow type (opposed) jet mills (e.g., Majac (Hosokawa Alpine)), and rotational-flow type jet mills (e.g., STJ (Seishin Enterprise Co., Ltd.) and PJM (Nippon Pneumatic Mfg. Co., Ltd.).

As fused alumina particles per se have conventionally been employed as an abrasives, they cause considerable and problematic wear in a machine for handling them. Thus, running cost of the machine must be taken into account. From this viewpoint, a counter-flow type jet mill, in which few particles are brought into direct contact with the inner wall of the mill, is preferably employed.

No particular limitation is imposed on the mode of operation of the opposed jet mill. However, a batch operation, rather than a typical continuous operation, is employed. In a preferred mode, raw material is fed in advance to the mill in such an amount that a pusher nozzle is buried in the material, and the operation is started. During operation, no additional raw material is fed to the mill. After operation for a predetermined period of time, the mill is stopped, and the powder in the mill is removed as a product through a lower discharge outlet.

Fused alumina is virtually formed of a single crystal and has high hardness. Thus, the so-called "pulverization" of alumina, in a jet mill, hardly occurs. One possible reason for formation of roundish fused alumina particles by means of a jet mill is the following. When fused alumina particles are processed by means of a jet mill, the characteristic edges of fused alumina particles are broken through collision between particles. Through repetition of such collisions, the number of sharp edges are reduced. Fine debris formed by collision is discharged to the outside of the system by a classifier, and coarse particles having no sharp edges remain in the mill.

The roundness is preferably controlled on the basis of operation time. When the operation time is too short, the roundness is insufficient, whereas when the operation time is excessively long, the process is not economical.

No particular limitation is imposed on the jet mill nozzle pressure, and a higher nozzle pressure is preferred from the viewpoint of shaping efficacy. In consideration of the cost for realizing pressure-resistance of a machine, a nozzle pressure of 0.6 to 0.8 MPa is preferred.

No particular limitation is imposed on the lower cut point of the classifier, and the lower cut point may be predetermined on the basis of the desired product.

The roundish fused alumina particles according to the present invention are preferably incorporated into a rubber or a resin composition and, particularly, in high-thermal-conductivity rubber or resin compositions and in wear-resistant resin compositions especially containing alumina at high filling ratio.

A high-thermal-conductivity rubber or resin composition preferably contains the roundish fused alumina particles in an amount of 80 mass % or more.

In the present invention, no particular limitation is imposed on the resin for forming the aforementioned high-thermal-conductivity resin composition, and any known resin may be employed. Examples of the resin include unsaturated polyester resins, acrylic resins, vinyl ester resins, epoxy resins, xylene-formaldehyde resins, guanamine resins, diallyl phthalate resins, phenolic resins, furan resins, polyimide resins, melamine resins, and urea resins. Among these, unsaturated polyester resins, acrylic resins, vinyl ester resins, epoxy resins, etc. are preferred.

In the present invention, no particular limitation is imposed on the resin for forming the aforementioned wear-resistant resin composition, and any known resins may be employed. Examples of the resin include unsaturated polyester resins, acrylic resins, vinyl ester resins, epoxy resins, xylene-formaldehyde resins, guanamine resins, diallyl phthalate resins, phenolic resins, furan resins, polyimide resins, melamine resins, and urea resins. Among these, melamine resins, phenolic resins, etc. are preferred.

In the present invention, no particular limitation is imposed on the rubber for forming the aforementioned high-thermal-conductivity rubber composition, and any known rubber may be employed.

The present invention will next be described in detail by way of Examples and Comparative Examples, which should not be construed as limiting the invention thereto.

<Method for Determining Roundness>

The projection area of a particle (a) and the peripheral length of the projection area were measured. The area of a true circle having a peripheral length equal to the peripheral length of the projection image of the particle (b) was calculated. The roundness was calculated by dividing (a) by (b). As the shape of a particle approximates a true circle, the roundness of the particle approaches 1.

In the case where the mean particle size was found to be 200 μm or less, the mean roundness was determined by use of an FPIA-2000 (product of Sysmex).

In the case where the mean particle size was found to be 200 μm or more, the mean roundness was determined by use of a Luzex graphic image analyzer.

<Bulk Density>

Bulk density is determined in accordance with JIS-R6126 (1976). That is, an apparatus shown in FIG. 1, which is composed of funnel 1, stopper 2, cylinder 3 and support 4, was used to determine a bulk density (According to JIS R6126-1970, the funnel 1 is made of stainless steel, and the stopper 2 and cylinder 3 are made of brass, the cylinder 3 being JIS H3631 (a brass seamless tube with a brass bottom). The sizes in FIG. 1 are described in mm, and sizes and shapes of the parts other than ones specified in FIG. 1 may be appropriately determined.)

(1) determining the volume V (ml) of the cylinder;

(2) plugging the outlet of the cylinder with the stopper, charging about 120 g of sample in the funnel, and then locating the cylinder under the funnel;

(3) pulling out the stopper to drop the all of the sample into the cylinder, removing a heaped part of the sample from the cylinder as if scooping it up, and then weighting the sample in the cylinder;

(4) repeating the steps (2) and (3) above for the same sample to obtain 3 measurement $W_1$ (g), $W_2$ (g) and $W_3$ (g); and (5) calculating a bulk density from the volume V (ml) of the step (1) and the 3 measurement $W_1$ (g), $W_2$ (g) and $W_3$ (g) of the step (4) above, according to the following formula:

Bulk density (g/ml)=$\{(W_1+W_2+W_3)/3\}/V$

EXAMPLE 1

Alumina balls (HD-2, 20 mmφ, product of Nikkato Corporation) (8 kg) were placed in a counter-flow type jet mill (200 AFG, product of Hosokawa Alpine). Fused alumina (mean particle size: 70 μm, product of Showa Denko K.K.) (10 kg) was placed on the alumina balls. Shaping was performed at a nozzle pressure of 0.6 MPa and a classifier rotation speed of 2,000 rpm for a predetermined times (15 min, 30 min, 60 min, and 120 min) for rounding the particles. After rounding, roundness, bulk density, and mean particle size (Micro-truck HRA) of the resulted particles were determined. The results are shown in Table 1.

TABLE 1

| | Mean particle size (μm) | Bulk density | Roundness |
|---|---|---|---|
| Starting material | 75.6 | 1.80 | 0.830 |
| 15 min. shaping | 72.8 | 1.88 | 0.863 |
| 30 min. shaping | 72.5 | 1.92 | 0.864 |
| 60 min. shaping | 71.7 | 1.96 | 0.872 |
| 120 min. shaping | 67.9 | 1.99 | 0.887 |

EXAMPLE 2

Alumina balls (HD-2, 20 mmφ, product of Nikkato Corporation) (8 kg) were placed in a counter-flow type jet mill (200 AFG, product of Hosokawa Alpine). Fused alumina (mean particle size: 500 μm, product of Showa Denko K.K.) (10 kg) was placed on the alumna balls. Shaping was performed at a nozzle pressure of 0.6 MPa and a classifier rotation speed of 2,000 rpm for a predetermined time (15 min, 30 min, 60 min, and 120 min) for rounding the particles. After rounding, roundness, bulk density, and grain size (screen grain size) of the resulted particles were determined. The results are shown in Table 2.

TABLE 2

| | Sieve grain size | | | | | Bulk | |
|---|---|---|---|---|---|---|---|
| | 1 | 2 | 3 | 3 + 4 | F | density | Roundness |
| Starting material | 0 | 4 | 55 | 93 | 0 | 1.82 | 0.803 |
| 15 min. shaping | 0 | 2 | 34 | 66 | 20 | 2.07 | 0.866 |
| 30 min. shaping | 0 | 1 | 26 | 57 | 26 | 2.12 | 0.870 |
| 60 min. shaping | 0 | 1 | 26 | 52 | 30 | 2.18 | 0.875 |
| 120 min. shaping | 0 | 1 | 24 | 49 | 34 | 2.20 | 0.888 |

EXAMPLE 3

Alumina balls (HD-2, 20 mmφ, product of Nikkato Corporation) (8 kg) were placed in a counter-flow type jet mill (200 AFG, product of Hosokawa Alpine). Each of the fused alumina samples having mean particle size of 5 to 4,000 μm shown in Tables 3 to 8 (4,000 μm, 2,000 μm, 500 μm, 75 μm, 10 μm, and 5 μm, product of Showa Denko K.K.) (10 kg) was placed on the alumina balls. Shaping was performed at a nozzle pressure of 0.6 MPa and a classifier rotation speed tuned in accordance with the grain size of interest for rounding the particles. After rounding, roundness and bulk density of the resulted particles were determined.

The results are shown in Tables 3 to 8. The sizes attached to each of Tables 3 to 8 are mean particle sizes.

TABLE 3

Mean particle size: 4,000 μm

|  | Bulk density | Roundness |
|---|---|---|
| Starting material | 1.93 | 0.750 |
| After shaping | 2.08 | 0.883 |

TABLE 4

Mean particle size: 2,000 μm

|  | Bulk density | Roundness |
|---|---|---|
| Starting material | 1.98 | 0.784 |
| After shaping | 2.39 | 0.888 |

TABLE 5

Mean particle size: 500 μm

|  | Bulk density | Roundness |
|---|---|---|
| Starting material | 1.82 | 0.829 |
| After shaping | 2.18 | 0.898 |

TABLE 6

Mean particle size: 75 μm

|  | Bulk density | Roundness |
|---|---|---|
| Starting material | 1.8 | 0.830 |
| After shaping | 1.99 | 0.872 |

TABLE 7

Mean particle size: 10 μm

|  | Bulk density | Roundness |
|---|---|---|
| Starting material | — | 0.832 |
| After shaping | — | 0.886 |

TABLE 8

Mean particle size: 5 μm

|  | Bulk density | Roundness |
|---|---|---|
| Starting material | — | 0.832 |
| After shaping | — | 0.901 |

EXAMPLE 4

Starting material (fused alumina, mean particle size: 70 μm, product of Showa Denko K.K.) (15 kg/hr) was fed to a rotational-flow type jet mill (STJ-200, product of Seishin Enterprise Co., Ltd.). Shaping was performed at a pusher nozzle pressure of 0.74 MPa and a gliding nozzle pressure of 0.64 MPa for rounding the particles. After rounding, roundness, bulk density, and mean particle size (Micro-truck HRA) of the particles were determined. The results are shown in Table 9.

TABLE 9

|  | Mean particle size (μm) | Bulk density | Roundness |
|---|---|---|---|
| Starting material | 75.6 | 1.80 | 0.830 |
| After shaping | 74.5 | 1.97 | 0.856 |

EXAMPLE 5

Alumina balls (HD-2, 20 mmφ, product of Nikkato Corporation) (8 kg) were placed in a counter-flow type jet mill (200 AFG, product of Hosokawa Alpine). A fused alumina samples having mean particle size of 30 μm (product of Showa Denko K.K., WA No. 400) (10 kg) was placed on the alumina balls. Shaping was performed at a nozzle pressure of 0.6 MPa and a classifier rotation speed at 6000 rpm for 60 minutes for rounding the particles. The obtained roundish fused alumina has a mean particle size of 23.4 μm, and a roundness of 0.90.

A Silicone resin (TSE-3070 (A), product of GE Toshiba silicone) (25 g), a silicone resin (TSE-3070 (B), product of GE Toshiba silicone), and the roundish fused alumina obtained (200 g) was mixed at 50 rpm for 10 minutes by a mixer (T.K. HIVIS MIX03 type, product of Tokushukikakogyo Co., Ltd.), and then defoamed at 500 rpm for 5 minutes by a centrifuge defoamer (NBK-1 type, product of Nippon Seiki Co., Ltd). The resulted mixture was cured at 140° C. for 60 minutes to obtain a resin product.

The heat conductivity of the resulted resin product was determined by a quick thermal conductivity meter (QTM-500, product of Kyoto Electronics Manufacturing Co., Ltd.). The results are shown in Table 10.

COMPARATIVE EXAMPLE 1

A resin product was obtained and the thermal conductivity thereof was determined according to the Example 5 above, except that nearly-perfect-spherical alumina beads (CB-A20A, mean particle size 22.8 μm, roundness 0.96, product of Showa Denko K.K.) was used instead of the roundish fused alumina. The results are shown in Table 10.

COMPARATIVE EXAMPLE 2

A resin product was obtained and a thermal conductivity thereof was determined according to the Example 5 above, except that a roundish alumina which was not a fused alumina (AS-20, mean particle size 23.1 μm, roundness 0.90, product of Showa Denko K.K.) was used instead of the roundish fused alumina. The results are shown in Table 10.

TABLE 10

|  | Thermal conductivity (W/mk) |
|---|---|
| Ex. 5 | 1.2040 |
| Comp. Ex. 1 | 1.0555 |
| Comp. Ex. 2 | 1.1192 |

In comparison to the alumina of Example 5, the aluminas of Comparative Examples 1 and 2 have similar mean particle size and better roundness. However, as seen from Table 10, the resin product of Example 5 has a larger heat conductivity by about 10% than that of Comparative Examples 1 and 2. That is, the roundish fused alumina of Example 5 is a superior thermally-conductive filler.

EXAMPLE 6

To a melamine resin (Suntop M-700, product of Nissan Chemical Industries, Ltd.) (10 g), a roundish fused alumina (1.5 g) having a mean diameter of 70 μm, which was shaped for 60 minutes as in Example 1 was mixed, and cured into cylindrical bodies having a diameter of 25 μm. The cylindrical bodies cured were polished with an auto-polishing machine (Automet II polishing machine/Ecomet III polishing machine, Product of BUEHLER) to determine the weight-loss of the samples caused by the polishing. The polishing was achieved by applying a SiC water-proof abrasive paper (No. 240) on the Ecomet III polishing machine, locating three samples on the Automet II polishing machine, and then rotating the Ecomet III polishing machine at 150 rpm with providing water to polish the samples for 20 minutes, while providing down force of 5.4 kg by the Automet II polishing machine which was rotating at 30 rpm. The results are shown in Table 11.

COMPARATIVE EXAMPLE 3

To a melamine resin (Suntop M-700, product of Nissan Chemical Industries, Ltd.) (10 g), a fused alumina (1.5 g) having a mean diameter of 75 μm was mixed, and cured into cylindrical bodies having a diameter of 25 μm. The cylindrical bodies cured were polished with the auto-polishing machine as in Example 6 to determine the weight-loss of the samples caused by the polishing. The results are shown in Table 11.

TABLE 11

|  | Weight-loss (total amount of 3 samples) |
| --- | --- |
| Ex. 6 | 0.182 g |
| Comp. Ex. 3 | 0.204 g |

It is seen from Table 11 that the weight-loss of the samples of Example 6, which use roundish fused alumina, is smaller that that of Comparative Example 3, which use normal fused alumna. It is believed that this is because a roundish filler is preferable for improving wear resistance.

The invention claimed is:

1. A method for producing roundish fused alumina particles, wherein the roundish fused alumina particles have a mean particle size of 5 to 4,000 μm and a roundness of 0.85 or more, wherein the method comprises removing edges of fused alumina particles by making the fused alumina particles collide with each other.

2. A method for producing the roundish fused alumina particles according to claim 1, wherein the method comprises removing edges of fused alumina particles by means of a jet mill.

3. The method for producing the roundish fused alumina particles according to claim 2, wherein the jet mill is a counter-flow type jet mill.

4. The method for producing the roundish fused alumina particles according to claim 2, wherein the jet mill is a rotational-flow type jet mill.

5. The method for producing the roundish fused alumina particles according to claim 3, wherein the counter-flow type jet mill is one which can arbitrarily control nozzle pressure, rotation speed of a classifier, and operation time thereof.

6. The method for producing the roundish fused alumina particles according to claim 3, wherein the counter-flow type jet mill is operated at a nozzle pressure of 0.6 to 0.8 MPa.

7. The method for producing the roundish fused alumina particles according to claim 3, wherein the counter-flow type jet mill is operated in a batch manner and the residue is provided as a product.

8. A method for producing a wear resistant resin composition, comprising producing the roundish fused alumina particles according to the method of claim 1, and then incorporating the roundish fused alumina particles to a resin.

9. A method for producing a high-thermal-conductivity rubber composition, comprising producing the roundish fused alumina particles according to the method of claim 1, and then incorporating the roundish fused alumina particles to a rubber.

10. A method for producing a high-thermal-conductivity resin composition, comprising producing the roundish fused alumina particles according to the method of claim 1, and then incorporating the roundish fused alumina particles to a resin.

* * * * *